United States Patent [19]

Duzich

[11] 4,355,280
[45] Oct. 19, 1982

[54] ACCUMULATOR CONDITION INDICATOR WITH SPRING BIASING TO INDICATE LINEAR DISPLACEMENT OF A PISTON

[75] Inventor: John J. Duzich, Oakdale, N.Y.

[73] Assignee: Grumman Aerospace Corporation, Bethpage, N.Y.

[21] Appl. No.: 149,309

[22] Filed: May 13, 1980

[51] Int. Cl.³ .................. G01B 7/14; G01N 27/72; G01R 33/00
[52] U.S. Cl. .................................. 324/207; 73/745; 340/614; 324/225
[58] Field of Search .............. 324/207, 208, 225, 251; 340/614, 626; 73/301, 714–717, 744–746; 200/82 E, 81.9 M

[56] References Cited

U.S. PATENT DOCUMENTS

| | | | |
|---|---|---|---|
| 2,373,292 | 4/1945 | Clason | 73/301 |
| 2,721,994 | 10/1955 | Brown | 324/225 |
| 2,907,897 | 10/1959 | Sander | 73/DIG. 3 |
| 2,987,669 | 6/1961 | Kallmann | 73/DIG. 3 |
| 3,118,108 | 1/1964 | Zoss et al. | 73/DIG. 3 |
| 3,180,152 | 4/1965 | Metzger et al. | 73/384 |
| 3,260,117 | 7/1966 | Rush | 324/207 |
| 3,286,528 | 11/1966 | Jullien-Davin | 73/398 |
| 3,412,602 | 11/1968 | Rush et al. | 73/DIG. 3 |
| 3,575,054 | 4/1971 | Glista | 73/398 |
| 3,648,155 | 3/1972 | Soehner | 323/94 H |
| 3,867,844 | 2/1975 | Shimizu et al. | 73/517 |
| 3,965,317 | 6/1976 | Gratzmuller | 340/614 |

FOREIGN PATENT DOCUMENTS 245256 11/1962 Australia .

Primary Examiner—Gerard R. Strecker
Assistant Examiner—Walter E. Snow
Attorney, Agent, or Firm—Richard G. Geib

[57] ABSTRACT

An accumulator fluid indicator useful to measure the linear displacement of a piston without the use of a dynamic seal. A Hall Effect sensor mounted on the outer surface of the accumulator is used to sense the piston location while isolated from the fluid flow. Temperature and pressure sensors may be used to supplement the accuracy of the position indicator by compensating for errors due to changes in temperature or pressure applied to the pressurant.

12 Claims, 4 Drawing Figures

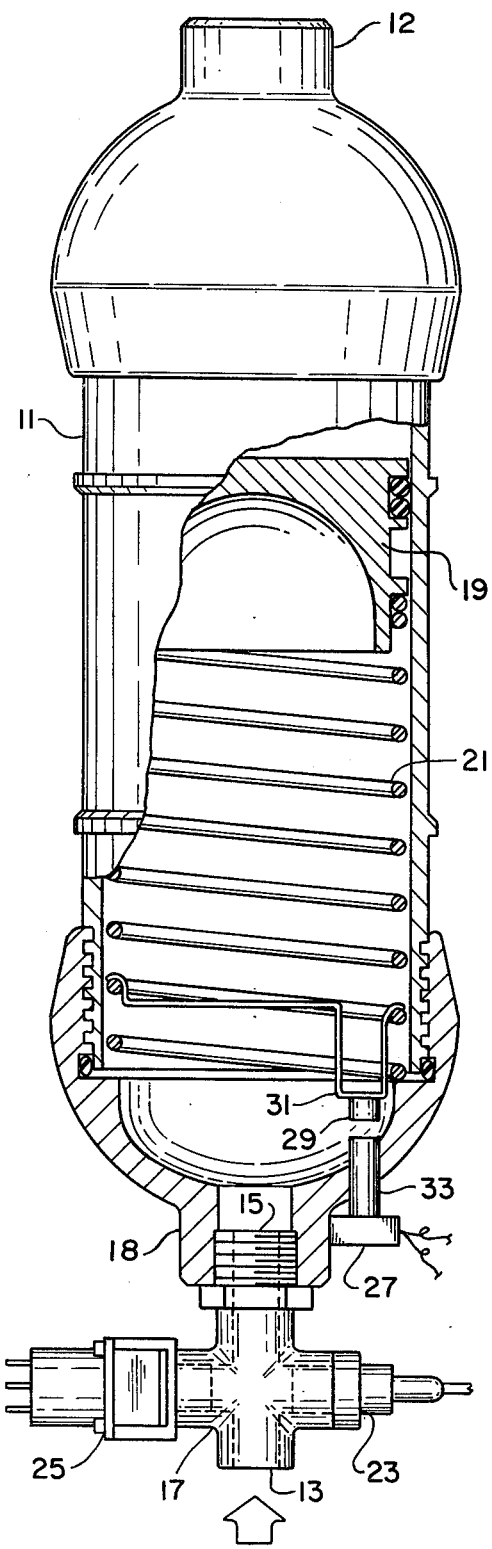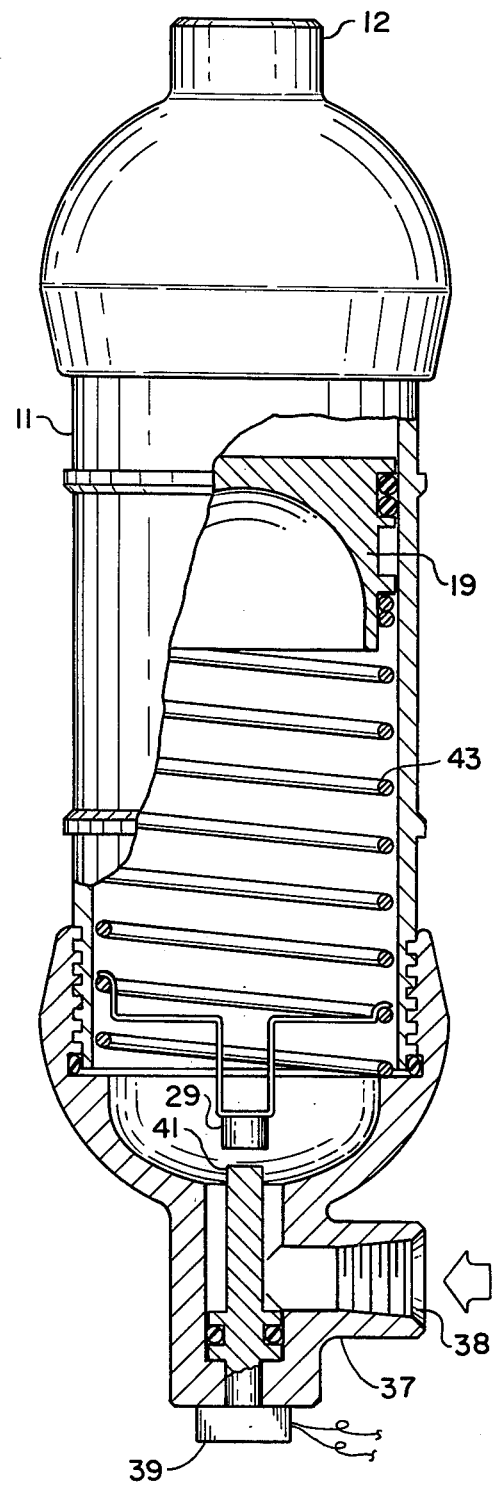
Figure 1
Figure 2

ACCUMULATOR CONDITION INDICATOR WITH SPRING BIASING TO INDICATE LINEAR DISPLACEMENT OF A PISTON

BACKGROUND OF THE INVENTION

The present invention relates to hydraulic accumulators, and more specifically, to fluid level indicators useful in determining the linear displacement of a piston within the accumulator.

Hydraulic accumulators are energy storage devices, typically used in many aircraft hydraulic systems. They usually employ stored gas as the variable energy source. Their applications include hydraulic pump ripple attenuation, momentary system power over-demand conditions, and performance of emergency actuation functions such as deploying a ram air turbine via a hydromechanical actuator.

The work output is dependent on initial precharge pressure, precharge temperature and delta volume change caused by piston movement under varying demand conditions. In order to monitor accumulator precharge condition, the charging pressure, temperature, and piston displacement must, therefore, be determined.

Prior art methods of determining fluid level displacement or piston displacement within a pressurized accumulator include electro-optical devices and direct action devices. Further details of an improved electro-optical system of this general type can be observed by a reading of U.S. Pat. No. 3,995,168, assigned to the common assignee herewith entitled Electro-Optical Fluid Measurement System, issued Nov. 30, 1976.

In one construction of a direct action accumulator device, a rod is attached to the piston which passes through a dynamic seal in the accumulator. In another construction, a rotary measuring device is attached to the piston on the oil side of the accumulator. Typically a linear potentiometer is connected to the movable piston rod such that a direct relationship can be obtained by measuring resistance versus displacement.

Accordingly, it is a principle object of the present invention to provide an accumulator fluid indicator wherein the linear displacement of a piston may be determined by sensor means mounted external to the pressurized fluid environment.

It is another object of the present invention to provide means for determining piston linear displacement without requiring the use of a dynamic seal.

It is a further object of the present invention to provide means for determining piston linear displacement wherein temperature compensation means eliminate output variations as a function of ambient temperature.

SUMMARY OF THE INVENTION

Briefly, these and other objects and advantages are accomplished in the present invention by providing a movable permanent magnet coupled to the accumulator spring biased piston. Movement of the magnet is detected by Hall Effect sensor means mounted external to the pressurized fluid. Magnetic transfer means, composed of highly permeable material, are interposed between the sensor means and the permanent magnet. The transfer means serve as a flux concentrator to more effectively transfer magnetic flux to the sensor as the piston traverses the accumulator housing.

Temperature compensation may be provided by connecting the output of temperature transducer means to electronic correction means operative to modify the sensor means output signal in response to the sensed temperature.

Other objects and features will become apparent when viewed in connection with the accompanying figures.

BRIEF SUMMARY OF THE DRAWINGS

FIG. 1 illustrates the invention in its presently preferred embodiment.

FIG. 2 illustrates another embodiment of the present invention.

DETAILED DESCRIPTION OF THE DRAWINGS

Figure 3:
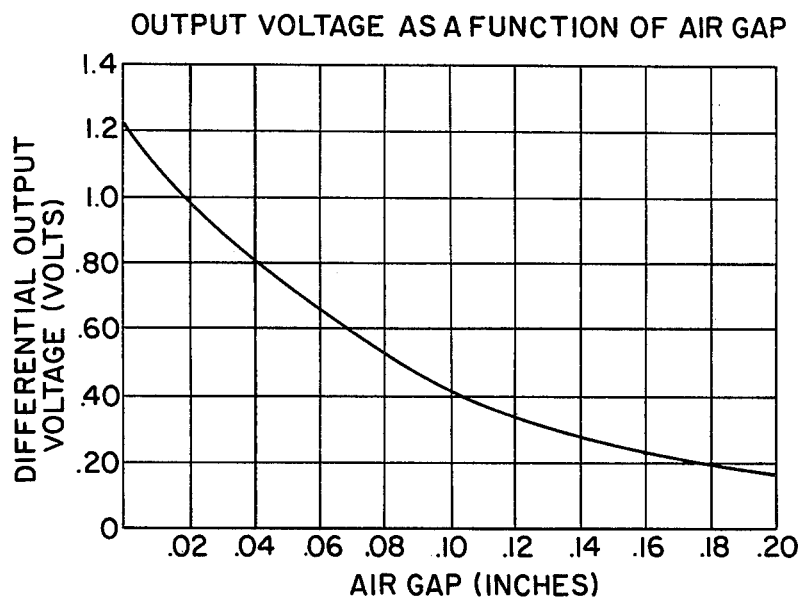
FIG. 3 graphically illustrates a typical Hall Effect sensor output voltage as a function of air gap.

With more particular reference to FIG. 1, there is shown an accumulator 11 suitable for use in conjunction with conventional aircraft systems. Accumulator 11 may form one portion of an aircraft hydraulic system whose overall performance and status is to be monitored.

One such comprehensive hydraulic monitoring system is described in my previous patent entitled Aircraft Onboard Operational Status Indicator, U.S. Pat. No. 4,115,754, issued Sept. 19, 1978 and assigned to the common assignee herewith. It is as an improvement in such systems that this invention finds primary application.

A pressurant such as dry nitrogen or air enters accumulator 11 via ports 13 and 15 of connecting fitting 17 connecting to accumulator neck portion 18. The pressurant precharge level is determined by the intended application and may typically be of the order of 500–2000 psi. After precharge pressurant port 13 is isolated to maintain pneumatic precharge. Precharge pressure entering port 13 forces piston 19 to traverse along the longitudinal axis of the accumulator to an initial bottoming position. System hydraulic fluid pressure enters the accumulator 11 via hydraulic port 12. Hydraulic fluid pressure displaces piston 19 against precharge pressure in the accumulator lower portion until an equilibrium is reached.

Piston 19 is connected to spring means 21 as to be compressed by the movement of the piston in response to increased hydraulic pressure. Spring means 21 is formed of resilient material and is preferably wound at a predetermined rate as to have a known spring rate, whereby the additional force component against piston 19 corresponding to any compression of spring means 21 may be readily determined by measuring the linear displacement of the spring. Precharge pressure, precharge temperature and piston initial displacement are each factors to be considered in determining the work output caused by piston movement.

Pressure transducer 23 is shown connected to fitting 17 for determining the precharge pressure (accumulator pressure). One commercially available device which may be suitable for this application is manufactured by Entran Devices, model EPS-1032. This miniature device is a thread-mounted semiconductor straingage sensor which is characterized by a linear output over the normal operating range (0–3000 psi). Temperature shifts at the outer regions of the design temperature band may be compensated for linearity by using an external compensation module as will be more fully explained below.

Temperature transducer 25 is also shown connected to fitting 17 although in practice both pressure and temperature transducers may form an integral portion of accumulator 11. For purposes of this application, the I/C two-terminal temperature transducer manufactured by Analog Devices, model AD 590C, is suitable in terms of size and performance. Output current of the AD 590C is proportional to the absolute temperature with a compatibility for a wide range of supply voltages.

The variables which affect the precharge piston position are precharge fluid pressure and temperature as well as the opposing hydraulic fluid pressure. The effect of precharge fluid temperature change will depend upon whether or not the hydraulic fluid reservoir is compressible within the system. The need to accurately determine the precharge fluid temperature is, therefore, readily apparent where precharge fluid thermal expansion is a factor in determining piston position. Various resistance type temperature sensors and thermistor temperature sensors may also be employed to provide the functions of temperature transducer 25 to measure precharge fluid temperature.

Piston displacement is sensed by means of Hall Effect sensor 27. It should be noted that most electrical indicators usually produce discrete signals (go/no-go type). In the present invention, however, an analog signal is required, which may be provided by using the approach shown in FIGS. 1 and 2. These concepts utilize a linear output Hall Effect sensor 27 actuated by a movable permanent magnet 29 which is coupled to piston 19.

Spring means 21 serves to down scale the movement of the magnet 29 with respect to piston 19 displacement in response to variations in the hydraulic pressure entering port 12. Since the Hall Effect sensor is designed to operate most accurately over a prescribed range of displacement, it is critical to select a bias spring which will provide this range of displacement for the hydraulic variations to be encountered.

Mounting means 31 secures magnet 29 in place with respect to an appropriate position along the spring 21. Flux gathering material 33 is interposed between magnet 31 and Hall Effect sensor 27 and may be composed of high permeability material such as Permaloy. The presence of the flux gathering material 33 allows the sensor 27 to be able to detect movement of magnet 29 at distances which would otherwise be beyond the detection range of the sensor.

One skilled in the art will recognize that the size of the flux gathering material and the strength of the magnet are functions of the expected movement of the magnet and the sensitivity of the sensor. A suitable Hall Effect sensor which integrates the Hall cell and an amplifier into one monolithic device is produced by Sprague Electric Company, model UGN 3501M. This device provides a linear differential output which is a function of magnetic field intensity.

FIG. 3 graphically illustrates the output of such a Hall Effect sensor as a function of air gap. Assuming an air gap variation of 0.02-0.08", for example, it can be seen that the output voltage will vary from approximately 0.05-1.0 volts. By reference to other characteristic curves of the exemplary device, available from the manufacturer, the necessary flux density to produce this range of output voltage may be determined. In turn, the appropriate sizes of the magnet and the flux gathering material may be ascertained according to standard techniques well known to those skilled in the art. These parameters may be subject to variation according to the most convenient size, location, composition or orientation of the components. Such changes in size, location and material selection may each be made within the purview of the present invention according to techniques well known in the art.

According to the construction techniques described above, the Hall Effect sensor 27 may be located external to the pressurized fluid environment thereby simplifying construction and repair as well as minimizing the effect of the charged fluid environment on the operation of the sensor.

According to the construction of FIG. 1, the flux gathering material 33 is interposed internal to the accumulator housing while the Hall Effect sensor is shown fixed to the outer surface of accumulator. While this construction will be suitable for some applications, it may be desirable to avoid the use of a sealed plug in the accumulator housing for seating the flux gathering material and the sensor.

The construction illustrated in FIG. 2 has the advantage of eliminating the need for an additional port in the accumulator thereby being more compatible with existing accumulator designs. According to the embodiment shown in FIG. 2, sensor 27 and flux gathering material 41 may be either contained within a fitting connected to accumulator 11 or may form an integral portion of the accumulator neck. Fitting means 37 provides an avenue for precharge pressurant through pressurant charging port 38 and may be formed of a T-shaped connection (or the like) for allowing attachment of pressure and temperature sensing devices as shown in FIG. 1.

As with FIG. 1, the Hall Effect sensor 39 of FIG. 2 is shown as being in static sealing engagement with the flux gathering material 41. Dynamic sealing difficulties and the expense associated therewith are accordingly obviated by the illustrated constructions. The shape of flux gathering material 41 may, of course, assume any convenient form depending upon the selected configuration of the fitting 37 and the accumulator housing.

Figure 4:
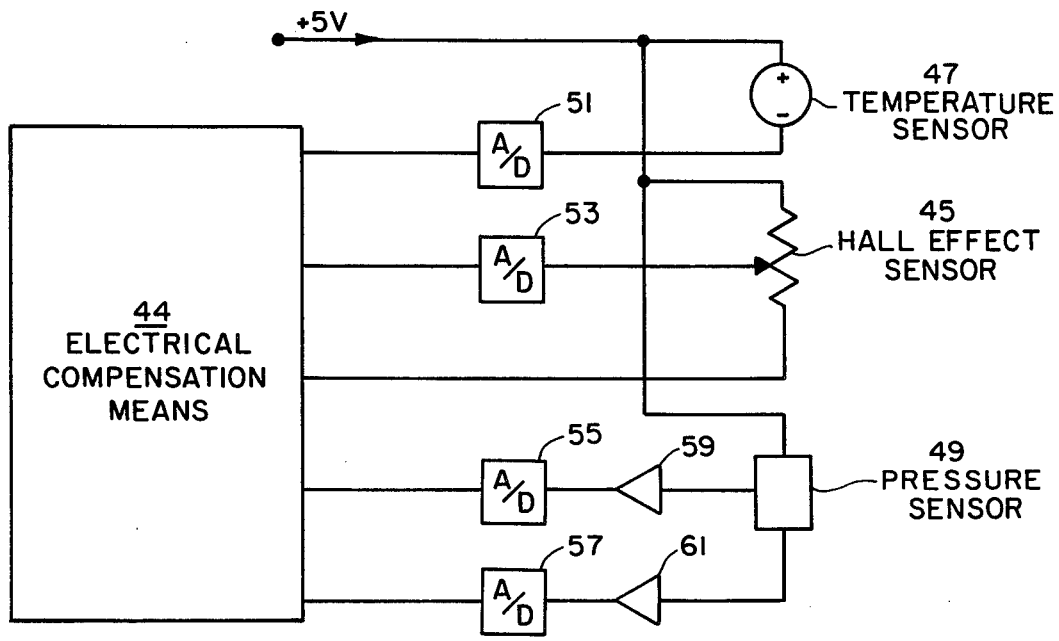
FIG. 4 is a schematic representation showing the electronic signal correction means operative to provide temperature and pressure compensation.

FIG. 4 is a schematic representation of a compensation network which may be used to adjust and measure the sensed piston position variations in accordance with system conditions. Changes in piston displacement are correlated to pressurant temperature and pressure conditions to determine the compensated piston position. Electrical compensation means 44 is, therefore, adapted to receive inputs from Hall Effect sensor 45, temperature sensor 47 and pressure sensor 49. Analog-to-digital converters 51, 53, 55 and 57 operate to convert the sensor output signals to an appropriate D.C. from for processing by compensation means 44. Operational amplifiers 59 and 61 serve to amplify the outputs of the pressure sensor to levels which will drive analog-to-digital converters 55 and 57 respectively. The actual piston displacement is thereby determined by compensation means 44 according to a predetermined set of instructions included within the compensation means. In practice, the functions of compensation means 44 may be provided by microcomputer means such as the Intel model 8748 which is easily programmable and has sufficient storage for additional instructions and add-on features. This particular device has the added advantage of including an erasable program memory which may be varied for tests and evaluation during the prototype and preproduction stages.

While the invention has been described in the presently preferred embodiment, it is understood that the words which have been used are words of description rather than words of limitation and that changes within the purview of the appended claims may be made without departing from the scope and spirit of the invention in its broader aspects.

What is claimed is:

1. An accumulator condition indicator comprising:
    an accumulator housing connected at a first end to a source of pressurized fluid;
    a movable member disposed within said housing as to separate said pressurized fluid from a biasing pressurant, said member being adapted to traverse within said housing in response to the applied pressurized fluid;
    spring biasing means interposed within said housing in the region of said pressurant and adapted to be compressed by the motion of said movable member so as to provide a motion that is representative on a smaller scale of the motion of the movable member;
    magnetic field producing means attached to said spring means to traverse through a desired range within said housing in response to the movement of said movable member;
    magnetic sensor means attached to said housing and isolated from said fluid, said sensor means being adapted to provide an electrical signal responsive to the proximity of said field producing means, and
    magnetic transfer pole means positioned between said sensor means and said field producing means as to insure magnetic communication between said field and said sensor means.

2. The apparatus as recited in claim 1 further including temperature transducer means connected to said housing and adapted to provide an electrical signal in response to the temperature of said pressurant.

3. The apparatus as recited in claim 1 further including pressure transducer means connected to said housing and adapted to provide an electrical signal in response to the pressure applied to said pressurant.

4. The apparatus as recited in claim 2 further including electrical signal correction means for adjusting the signal from said magnetic sensor means in response to pressurant temperature as measured by the output of said temperature transducer means.

5. The apparatus as recited in claim 3 further including electrical signal correction means for adjusting the signal from said magnetic sensor means in response to pressurant pressure as measured by the output of said pressure transducer means.

6. A hydraulic indication system for sensing the linear displacement of a piston, said system comprising:
    an accumulator housing connected to a source of pressurized fluid;
    piston means disposed within said housing and separating said pressurized fluid from a biasing precharge pressurant, said piston being adapted to traverse within said housing in response to the applied pressurized fluid;
    spring biasing means interposed within said housing in the region of said pressurant and adapted to be compressed by the motion of said piston means so as to provide a motion that is representative on a smaller scale of the motion of said piston means;
    magnetic field producing means attached to said spring means as to traverse through a desired range within said housing in response to the movement of said piston means;
    magnetic sensor means attached to said housing and isolated from said fluid, said sensor means being adapted to provide an analog electrical position signal which varies with the proximity of said field producing means;
    magnetic transfer pole means positioned between said sensor means and said field producing means as to insure magnetic communication between said field and said sensor means;
    temperature transducer means connected to said housing and adapted to provide an electrical signal in response to the temperature of said pressurant;
    pressure transducer means connected to said housing and adapted to provide an electrical signal in response to the pressure applied to said pressurant; and
    piston displacement correction means electrically connected to said magnetic sensor means, temperature transducer means and pressure transducer means, said correction means being adapted to modify said position signal in response to the temperature and pressure conditions.

7. An accumulator condition indicator comprising:
    an accumulator housing connected to a source of pressurized fluid;
    a movable member disposed within said housing and separating said pressurized fluid from a biasing precharge pressurant, said member being adapted to traverse within said housing in response to the applied pressurized fluid;
    spring biasing means interposed within said housing in the region of said pressurant and adapted to be compressed by the motion of said piston means so as to provide a motion that is representative on a smaller scale of the motion of the movable member;
    magnetic field producing means attached to said spring means as to traverse through a desired range within said housing in response to the movement of said movable member, and
    fitting means connected to an accumulator neck portion in communication with said pressurant region as to form a fluid-tight seal therewith, said fitting means including an internal conduit for communicating pressurant flow therethrough, said fitting means further including magnetic sensor means isolated from said pressurant by magnetic transfer pole means, said transfer pole means being in contact with said pressurant in the region of said field producing means as to increase magnetic communication between said field and said sensor means.

8. The apparatus as described in claim 7 further including temperature transducer means connected to said fitting means and in communication with said pressurant as to provide an electrical signal in response to the temperature of said pressurant.

9. The apparatus as recited in claim 7 further including pressure transducer means connected to said fitting means and in communication with said pressurant as to provide an electrical signal in response to the temperature of said pressurant.

10. The apparatus as recited in claim 8 further including electrical signal correction means for adjusting the signal from said magnetic sensor means in response to the pressurant temperature as measured by the output of said temperature transducer means.

11. The apparatus as recited in claim 9 further including electrical signal correction means for adjusting the signal from said magnetic sensor means in response to the pressurant pressure as measured by said output of said pressure transducer means.

12. An accumulator condition indicator comprising:
an accumulator housing connected to a source of pressurized fluid;
piston means disposed within said housing and separating said pressurized fluid from a biasing precharge pressurant, said piston being adapted to traverse within said housing in response to the applied pressurized fluid;
spring biasing means interposed within said housing in the region of said pressurant and adapted to be compressed by the motion of said piston means so as to provide a motion that is representative on a smaller scale of the motion of said piston means;
magnetic field producing means attached to said spring means as to traverse through the desired range within said housing in response to the movement of said piston means;
fitting means connected to an accumulator neck portion in communication with said pressurant region as to form a fluid-tight seal therewith, said fitting means including an internal conduit for communicating pressurant flow therethrough, said fitting means further including magnetic sensor means adapted to provide an analog electrical position signal which varies with the proximity of said field producing means, said sensor means being isolated from said pressurant by magnetic transfer pole means, said transfer pole means being in contact with said pressurant in the region of said field producing means as to increase magnetic communication between said field and said sensor means;
temperature transducer means connected to said fitting means and in communication with said pressurant as to provide an electrical signal in response to the temperature of said pressurant;
pressure transducer means connected to said fitting means and in communication with said pressurant as to provide an electrical signal in response to the pressure applied to said pressurant; and
piston displacement correction means electrically connected to said magnetic sensor means, temperature transducer means and pressure transducer means, said correction means being adapted to modify said position signal in response to the output of said temperature transducer means.

* * * * *

UNITED STATES PATENT AND TRADEMARK OFFICE
CERTIFICATE OF CORRECTION

PATENT NO. : 4,355,280
DATED : Oct. 19, 1982
INVENTOR(S) : John J. Duzich

It is certified that error appears in the above–identified patent and that said Letters Patent are hereby corrected as shown below:

Cover page at [54], "ACCUMULATOR CONDITION INDICATOR WITH SPRING BIASING TO INDICATE LINEAR DISPLACEMENT OF A PISTON" should read -- ACCUMULATOR CONDITION INDICATOR--.

Col. 1, lines 2-4, "ACCUMULATOR CONDITION INDICATOR WITH SPRING BIASING TO INDICATE LINEAR DISPLACEMENT OF A PISTON" should read -- ACCUMULATOR CONDITION INDICATOR--.

Col. 3, line 65, "0.05" should read -- 0.50--.

Col. 4, line 55, "from" should read -- form--.

Signed and Sealed this

Nineteenth Day of April 1983

[SEAL]

Attest:

GERALD J. MOSSINGHOFF

Attesting Officer            Commissioner of Patents and Trademarks